Dec. 14, 1965  H. D. THOMPSON  3,223,975
LAST ONES COUNTER
Filed July 25, 1962
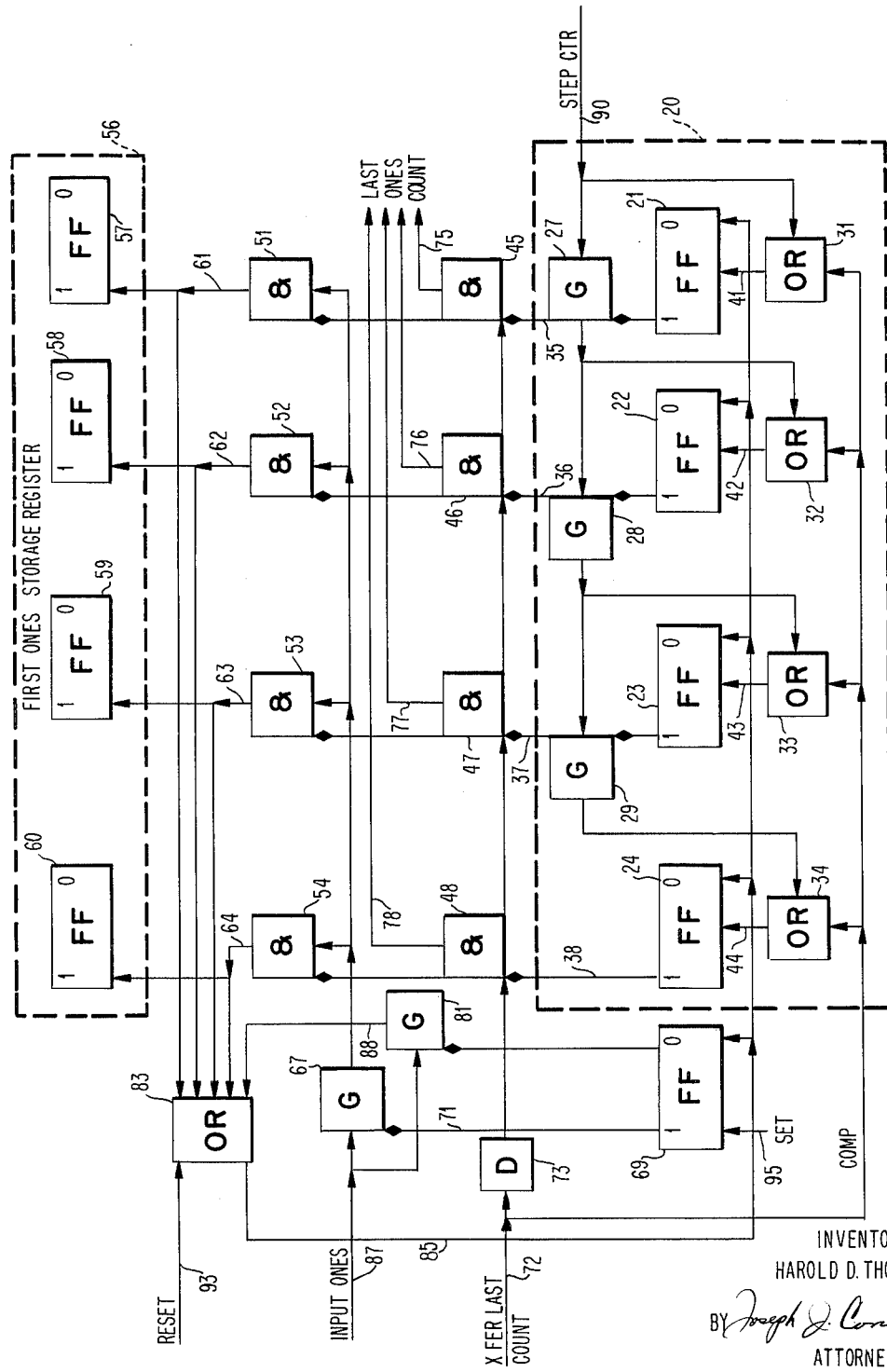
INVENTOR
HAROLD D. THOMPSON
BY Joseph J. Connerton
ATTORNEY

United States Patent Office 3,223,975
Patented Dec. 14, 1965

3,223,975
LAST ONES COUNTER
Harold D. Thompson, Kingston, N.Y., assignor to International Business Machines Corporation, New York, N.Y., a corporation of New York
Filed July 25, 1962, Ser. No. 212,193
6 Claims. (Cl. 340—146.3)

The present invention relates to circuitry for performing logical functions in a character reading apparatus and more specifically to a logical configuration for indicating the first and last time of occurrence of a signal having predetermined characteristics in a counting sequence.

In the art of character reading from a cathode ray tube display, one method employed is to scan the character or object on the C.R.T. screen line by line using the flying spot of the C.R.T. and a photopickup device to translate modulations of the projected light caused by the varied reflection emanating from the object being scanned into corresponding electrical signals. By dividing each line scanned into a specific number of time segments of substantially equal duration and identifying objects detected within each time segment, the resultant information may be quantized or converted into digital form for subsequent identity or redisplay of the object or character. Using a system of the above-described type, information from storage media such as photographic transparencies may be read using the flying spot scanner from a C.R.T. in the readout arrangement. During each line scan designated hereinafter as a scan sequence, it may be desirable to identify the first and last time an object is detected, each such detection being designated as a "strike." The resulting readout data when quantized into digital form would be stored for subsequent analysis by a computer to identify the displayed object. Accordingly, the present invention is directed to a logical configuration for identifying the time of the first and last strike during each scan sequence using a single counter. In the preferred embodiment of the persent invention, the relevant signals resulting from a strike are hereinafter designated as the first and last "ones" signals.

In the present invention, a scan counter is used to count the number of segments in a scan sequence. Detection of the first "ones" signal causes the contents of the counter to be transferred into a storage medium and the counter to be reset. As succeeding "ones" signals are received, the counter is reset by each ones signal, but the first "ones" count in the storage medium is not disturbed. Upon completion of a scan sequence indicated by an end of scan pulse, the contents of the counter containing the count from the last "ones" signal is complemented whereby the complemented value defines the time in the scan cycle when the last "ones" signal was encountered. Alternatively, the contents of the counter at the last "ones" time can be subtracted from the total number of segments in a scan to define the time at which the last "ones" signal occurred.

Accordingly, a primary object of the present invention is to provide an improved apparatus for identifying the first and last occurrence of a signal having predetermined characteristics from a sequence of signals.

A further object of the present invention is to provide an improved logical arrangement for indicating the first and last time when portions of an object or objects being scanned are detected in a scan sequence.

Another object of the present invention is to provide an improved counting system for providing outputs indicative of the time when the first and last portion of an object being scanned are detected in a line scan sequence using a single counter.

The foregoing and other objects, features and advantages of the invention will be apparent from the following more particular description of a preferred embodiment of the invention, as illustrated in the accompanying drawing.

In the drawing:
There is indicated in block logical form a preferred embodiment of the subject invention.

Throughout the following description and in the accompanying drawing there are certain conventions employed which are familiar to certain of those skilled in the art. Additional information concerning these functions is as follows: In the logical or block diagram of the drawing a conventional arrowhead is employed to indicate: (1) a circuit connection and (2) energization with pulse signals and (3) the direction of pulse travel which is also the direction of control. A diamond-shaped arrowhead indicates: (1) a circuit connection and (2) energization with a D.C. level. The input and output lines of the block signals are connected to the most convenient side of the block for ease of illustration. The circuit represented by the block is identified by labels within the block, such as FF represents a flip-flop, G a gate circuit, etc., A line entering a corner of a block symbol and energizing from the adjacent corner of the same block symbol indicates that the pulses or D.C. levels are applied as inputs to the circuit represented by the block and are simultaneously applied to additional circuits indicated by the line extension. In the description, the general arrangement of a preferred embodiment of this invention will be description with respect to the manner in which the various circuits, components and apparatus are interconnected, followed by a description of the general overall operation performed by these components and apparatus are interconnected, followed by a description of the general overall operation performed by these components and apparatus.

Referring now to the drawing, a binary counter 20 is composed of flip-flops 21–24, associated carry gates 27, 28 and 29 and input logical Or circuits 31–34 respectively. In the preferred embodiment herein described, the counter is shown connected in a straight binary progression from right to left such that flip-flop 21 represents the $2^0$ order, flip-flop 22 the $2^1$ order, flip-flop 23 the $2^2$ order and flip-flop 24 the $2^3$ order. While a four-position counter arrangement is shown and described in the preferred embodiment in the interest of clarity, it will be appreciated that the size of the counter is a matter of design choice and will vary directly with the number of segments employed in a specific scan sequence. Thus a 32 or 64 segment sequence would require 5 and 6 position counters respectively. Associated with flip-flops 21–24 are logical Or circuits 31–34 which provide the complement inputs to the associated flip-flops by way of lines 41–44 respectively. As is well-known in the art, a complement operation of a flip-flop effectively reverses the condition of the flip-flop from one bistable state to the other. The flip-flop outputs are shown and hereinafter designated as the "1" and "0" outputs respectively, wherein the "1" outputs represents the significant output level. A first set of logical And circuits 45–48 are conditioned by the "1" outputs from associated flip-flops 21–24 by way of lines 35–38 respectively, while a second set of logical And circuits 51–54 are likewise conditioned by the same flip-flop outputs. A storage medium comprising in the preferred embodiment a flip-flop register 56 designated the First Ones Storage Register composed of flip-flops 57–60 is connected to the respective outputs of logical And circuits 51–54 by way of lines 61–64. The pulse input to logical And circuits 51–54 is provided by the output from gate circuit 67, which in turn is conditioned by the "1" output from control flip-flop 69 by way of line 71 and sampled by the input "ones" signals. The second input to logical And circuits 45–48 is provided on line 72 labeled Xfer Last Count through delay unit 73. The last count transfer signal is applied to line 72 following the last counter step signal in each scan sequence. Gate circuit 81 is connected to the "0" output from control flip-flop 69, and also connected to receive the Input Ones signals via line 87.

Following detection of the first "ones" signal and reset of the control flip-flop, the counter 20 will continue to count in straight binary sequence in the manner previously described. As each "ones" signal is received on line 87, the output from gate circuit 81 will be applied through line 88 and logical Or circuit 83 to reset the counter flip-flops 21–24 and the control flip-flop 69, although the latter remains in its reset state. Following the last step pulse applied to line 90, the 16th pulse in the preferred embodiment, the transfer last count signal is applied to line 72 to perform two functions. First, the contents of counter 20 will be complemented through the associated logical Or circuits 31–34 to define the time at which the last "ones" signal was detected, and the signal which causes readout of the complemented counter value is delayed by delay circuit 73 to permit stabilization of the complemented counter value prior to readout through logical And circuits 45–48 by way of lines 75–78 respectively. The transfer last count pulse on line 72 is connected as one input to logical Or circuits 31–34 inclusive to complement the counter flip-flops and through delay circuit 73 to cause readout of the complemented value on lines 75–78 respectively.

The system interconnected in the above-described manner functions as follows. The input to binary counter 20 provided on line 90 labeled STEP CTR comprises the timing pulses used to step the scan counter. Prior to operation, the counter 20 as well as control flip-flop 69 will be reset to the zero state by a pulse applied from line 93 labeled Reset through logical Or circuit 83 and line 85. The control flpi-flop 69 is then set to the "1" state by applying a signal to line 95 immediately prior to operation. As each segment defining pulse in the scan sequence is applied to line 90, it will be simultaneously applied to sample gate circuit 27 and to complement flip-flop 21 through logical Or circuit 31. Starting with the counter in the clear or reset condition, the first input will complement flip-flop 21 from the "0" to the "1" state, which in turn conditions gate circuit 27 after the input pulse has terminated. The next input pulse on line 90 will reset flip-flop 21 to the zero state through logical Or circuit 31 and line 41, sample gate 27, the output of which complements flip-flop 22 to the one state and simultaneously sample gate circuit 28. The counter operates in the above manner counting in straight binary progression in synchronization with the input provided on line 90 until a maximum count of 15, representing the 16th scan segment, at which time flip-flops 21–24 are in the "1" state.

Whenever during a counting sequence the first indication of an object is sensed by the photopickup device, indicated by an input "ones" signal on line 87, gate circuits 67 and 81 will be sampled. Since control flip-flop 69 was initially set in the "1" state, gate circuit 67 is conditioned and the resultant output on line 88 from the first ones signal causes the contents of logical And circuits 51–54 to be applied to a storage register 56 such that the time in the scan sequence at which the first ones condition occurred, is stored in register 56. While it is possible that no detection will occur during a particular scan sequence, the timing sequence of the present invention ensures that the input "ones" signals on line 87 will follow the segment count on line 90. Since no detection is possible prior to counting the first segment, each input "ones" signal will produce an output from at least one of logical And circuits 51–54 through logical Or circuit 83 by way of line 85 to reset the counter flip-flops 21–24 as well as the control flip-flop 69. The control flip-flop 69 when reset in the zero condition deconditions gate circuit 67 and conditions gate circuit 81 such that subsequent input "ones" signals on line 87 will be gated through gate circuit 81 to reset counter 20 by way of logical Or circuit 83 and line 85.

A typical sequence of operation is illustrated in Table I below:

TABLE I

| Segments | Binary Count | Ones Input | Counter | Complemented Counter Value |
| --- | --- | --- | --- | --- |
| 0 | 0 0 0 0 | | 0 0 0 0 | |
| 1 | 0 0 0 1 | | 0 0 0 1 | |
| 2 | 0 0 1 0 | | 0 0 1 0 | |
| 3 | 0 0 1 1 | x (First) | 0 0 0 0 | |
| 4 | 0 1 0 0 | | 0 0 0 1 | |
| 5 | 0 1 0 1 | | 0 0 1 0 | |
| 6 | 0 1 1 0 | | 0 0 1 1 | |
| 7 | 0 1 1 1 | | 0 1 0 0 | |
| 8 | 1 0 0 0 | | 0 1 0 1 | |
| 9 | 1 0 0 1 | x | 0 0 0 0 | |
| 10 | 1 0 1 0 | | 0 0 0 1 | |
| 11 | 1 0 1 1 | | 0 0 1 0 | |
| 12 | 1 1 0 0 | | 0 1 0 1 | |
| 13 | 1 1 0 1 | x (Last) | 0 0 0 0 | |
| 14 | 1 1 1 0 | | 0 0 0 1 | |
| 15 | 1 1 1 1 | | 0 0 1 0 | 1 1 0 1 |

In the illustrative example in Table I, the sixteen time segments are designated 0–15 and their corresponding binary counterparts are shown in Column 2. The first "ones" count or input occurs at time segment 3, and this value is transferred to the First Ones Storage Register 56 and the counter is reset. The next "ones" signal is detected at time segment 9, and the counter is again reset to 0000. The last "ones" signal is detected at time segment 13, indicated as binary 1101, at which time the counter is reset. At the end of segment 15, the counter setting is 0010, which when complemented to 1101 identifies the time at which the last "ones" pulse occurred at segment 13, while the time of occurrence of the first "ones" signal is available in register 56.

In one specific embodiment built in accordance with the teachings of the instant invention, the fifth stage of a closed ring stepped by a one megacycle oscillator was employed to step counter 20, whereby step pulses were applied at 16 microsecond intervals and the complete scan of 16 segments utilized 256 microseconds.

Depending on the degree of precision desired, a more positive definition of an object can be provided with the instant invention by dividing each segment in which a signal is detected into a number of sub-segments, the number of such sub-segments corresponding to the degree of precision required.

With respect to the circuits illustrated in block form in the drawings, the specific details of the circuits, such as flip-flops, gate circuits, logical And and Or circuits, have been omitted as unnecessary to an understanding of the instant invention. Any group of compatible circuits which are well-known in the art may be employed. The gates and logical And circuits employed in the instant invention may in fact comprise the same circuit configuration, since they have been described in terms of their transfer or logical function rather than in terms of circuit configuration.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An apparatus for detecting the first and last indication of a character being sensed during a scanning sequence of a cathode ray tube comprising in combination
    means for dividing each line scan time into a plurality of substantially equal time segments,
    a binary counter, means for stepping said counter during each of said time segments,
a storage medium,
means for selectively interconnecting said counter to said storage medium,
means responsive to said first indication of said character for transferring the contents of said counter to said storage medium,
means responsive to succeeding indications of said character for resetting said counter
and means responsive to an end of scan signal for complementing the contents of said counter whereby the complemented value defines the time of said last character sensing indication.

2. In a cathode ray tube scanning system, apparatus for producing a first output indicative of the time when the first portion of a character is detected and a second output indicative of when the last portion of a character is detected during each scan sequence comprising in combination
  means adapted to produce a "ones" pulse when the scanning ray of said cathode ray tube intercepts a portion of the character being scanned,
  counting means responsive to signals generated as said scanning ray scans each segment in said scan sequence,
  storage means for storing the contents of said counter at the time of occurrence of the first "ones" pulse, said contents of said counter comprising said first output,
  means for gating into said storage means said first output upon the occurrence of said first ones pulse,
  means for complementing the contents of the counter upon occurrence of an end of scan transfer signal to produce said second output
  and control means for conditioning said gating means only up to the time of arrival of said first ones pulse and resetting said counter each time a "ones" pulse is received.

3. Apparatus for identifying the time of occurrence of the first and last signals of a randomly occurring group of signals during a predetermined time interval comprising in combination
  a binary counter,
  means for stepping said counter at substantially uniform time intervals,
  a storage medium,
  transfer means interconnecting the output of said counter to said storage medium, and
  control means responsive to said first signals for actuating said transfer means to transfer the contents of said counter into said storage medium
  and to succeeding signals in said group of signals for resetting said counter whereby the complement of said counter value at the completion of said predetermined time interval defines the time of occurrence of said last signal.

4. In a cathode ray tube scanning system, apparatus for producing a first output indicative of the time when the first portion of a character is detected and a second output indicative of when the last portion of a character is detected during each scan sequence wherein each scan sequence is divided into a predetermined number of time segments comprising in combination
  scanning means adapted to produce a "ones" pulse each time the scanning ray of said cathode ray tube intercepts a portion of the character being scanned,
  a counter,
  means for stepping said counter in synchronism with signals generated as said scanning ray scans each segment in said scan sequence,
  complementing means responsive to said counter output at the end of said scan for producing an output indicative of the time of entrance of the last "ones" pulse,
  storage means for storing the contents of said counter at the time of occurrence of the first "ones" pulse,
  a first plurality of logical And circuits for transferring into said storage means the contents of said counter upon the occurrence of the first "ones" pulse,
  a second plurality of logical And circuits for transferring into said complementing means the contents of the counter upon the occurrence of an end of scan transfer signal,
  and control means for conditioning said first plurality of logical And circuits only up to the time of arrival of said first "ones" pulse and resetting said counter each time a "ones" pulse is received.

5. Apparatus for producing an output indicative of the time a first signal is received and another output indicative of the time when the last signal in a train of signals is received comprising in combination
  a counter,
  control means responsive to the input of said counter for producing an indication of the time of occurrence of the first of said signals,
  a storage medium associated with said counter,
  means for transferring said first signal indication from said counter into said storage medium and
  control means responsive to said counter output for translating said counter value at the termination of said signal train into a value indicative of the time when said last signal in said train of signals was received.

6. A device of the character claimed in claim 5 wherein said control means for translating said counter value comprises means for complementing said counter following receipt of said last signal in said train of signals.

References Cited by the Examiner
UNITED STATES PATENTS

| | | | |
|---|---|---|---|
| 2,894,247 | 7/1959 | Relis | 340—146.3 |
| 2,897,481 | 7/1959 | Shepard | 340—146.3 |
| 3,025,495 | 3/1962 | Andres | 340—146.3 |

MALCOLM A. MORRISON, *Primary Examiner.*